United States Patent [19]

Sako et al.

[11] Patent Number: 4,829,497
[45] Date of Patent: May 9, 1989

[54] OPTICAL DISC RECORDING METHOD AND APPARATUS FOR DIGITAL DATA HAVING A PLURALITY OF TRANSMISSION RATES

[75] Inventors: Yoichiro Sako, Tokyo; Tamotsu Yamagami, Kanagawa; Shinichi Yamamura, Tokyo, all of Japan

[73] Assignee: Sony Corporation, Tokyo, Japan

[21] Appl. No.: 8,780

[22] Filed: Jan. 30, 1987

[30] Foreign Application Priority Data

Feb. 18, 1986 [JP] Japan ................... 61-33322

[51] Int. Cl.$^4$ ................................ G11B 15/52
[52] U.S. Cl. ........................ 369/50; 360/48; 360/53; 360/73; 358/342
[58] Field of Search ............ 369/47, 50, 13; 360/48, 360/49, 53, 71, 73; 358/335, 337, 338, 342; 371/37–38, 40, 50

[56] References Cited

U.S. PATENT DOCUMENTS

| | | | |
|---|---|---|---|
| 4,222,072 | 9/1980 | Bailey et al. | 358/342 |
| 4,229,808 | 10/1980 | Hui | 358/342 X |
| 4,355,338 | 10/1982 | Yamamoto et al. | |
| 4,382,268 | 5/1983 | Frimet | 360/73 |
| 4,419,699 | 12/1983 | Christopher et al. | 358/342 X |
| 4,532,561 | 7/1985 | Kimura et al. | 360/73 |
| 4,542,424 | 9/1985 | Ishihara | 369/47 X |
| 4,558,375 | 12/1985 | Sontheimer | 369/50 X |
| 4,562,577 | 12/1985 | Glover et al. | 358/342 X |
| 4,564,945 | 1/1986 | Glover et al. | 358/342 X |
| 4,603,412 | 7/1986 | Yamazaki | 358/342 X |
| 4,607,290 | 8/1986 | Murakami | 358/342 X |
| 4,622,602 | 11/1986 | Kutaragi | 360/48 |
| 4,631,714 | 12/1986 | Kahlman et al. | 369/47 X |
| 4,633,338 | 12/1986 | Sato et al. | 369/13 X |
| 4,641,294 | 2/1987 | Yoshimaru | 369/50 X |
| 4,660,099 | 4/1987 | Sugiyama et al. | 358/342 |
| 4,679,098 | 7/1987 | Williams et al. | 360/73 X |
| 4,688,225 | 8/1987 | Fukami et al. | 371/38 X |

FOREIGN PATENT DOCUMENTS

| | | |
|---|---|---|
| 0018157 | 10/1980 | European Pat. Off. . |
| 0129224 | 12/1984 | European Pat. Off. . |
| 0130091 | 1/1985 | European Pat. Off. . |
| 0137855 | 4/1985 | European Pat. Off. . |
| 0158067 | 10/1985 | European Pat. Off. . |
| 0137346 | 12/1986 | European Pat. Off. . |
| 2080997 | 2/1982 | United Kingdom . |
| 2082426 | 3/1982 | United Kingdom . |
| 2085199 | 4/1982 | United Kingdom . |
| 2088088 | 6/1982 | United Kingdom . |

OTHER PUBLICATIONS

Patent Abstracts of Japan, vol. 7, No. 238 (p–231) [1383], 10/22/83.
Patent Abstracts of Japan, vol. 9, No. 6 (P–326) [1729], 1/11/85.
Patent Abstracts of Japan, vol. 9, No. 236 (P–390) [1959], 9/21/85.
Patent Abstracts of Japan, vol. 9, No. 210 (P–383) [1933], 8/28/85.
Patent Abstracts of Japan, vol. 9, No. 232 (P–389) [1955], 9/18/85.
Shanmugam, *Digital and Analog Communication Systems*, 1979, pp. 520–521.

*Primary Examiner*—Alan Faber
*Assistant Examiner*—W. R. Young
*Attorney, Agent, or Firm*—Philip M. Shaw, Jr.

[57] ABSTRACT

When a time-sequential signal such as an audio or digital data signal is optically recorded on a disc-shaped recording medium, the transmission rate of the digital data is determined or the time-sequential audio signal is sampled at a predetermined sampling frequency to obtain time-sequential digital data which is sequentially recorded on the disc-shaped recording medium. The rotational speed of the disc-shaped recording medium is controlled in response to the transmission rate of the time-sequential digital data.

20 Claims, 4 Drawing Sheets

| Time-sequential Data Sampling Freq. x Word Length x Number of Channel) | Data Transmission Rate | Disc Rotational Speed |
|---|---|---|
| [1]  8 kHz x 8 bits x 48 | 3.072 Mbps | 1406 1/4 rpm |
| [2]  32 kHz x 8 bits x 12 | 〃 | 〃 |
| [3]  32 kHz x 16 bits x 6 | 〃 | 〃 |
| [4]  48 kHz x 16 bits x 4 | 〃 | 〃 |
| [5]  44.1 kHz x 16 bits x 4 | 2.8224 Mbps | 1406 1/4 x 441/480 |
| [6]  32 kHz x 12 bits x 8 | 3.072 Mbps | 1406 1/4 |
| [7]  44.1 kHz x 16 bits x 4 | 2.8224 Mbps | 1406 1/4 x 441/480 |
| [8]  8 kHz x 8 bits x 32 | 2.048 Mbps | 1406 1/4 x 2/3 |
| [9]  8 kHz x 8 bits x 24 | 1.536 Mbps | 1406 1/4 x 1/2 |
| [10] 8 kHz x 8 bits x 96 | 6.144 Mbps | 1406 1/4 x 2 |

OPTICAL DISC RECORDING METHOD AND APPARATUS FOR DIGITAL DATA HAVING A PLURALITY OF TRANSMISSION RATES

BACKGROUND OF THE INVENTION

1. Field of the Invention

This invention relates generally to a method and an apparatus for optically recording digital signals on a disc, and more particularly to such a method and an apparatus for optically recording time-sequential signals such as an audio signal and a video signal on a disc-shaped recording medium.

2. Description of the Prior Art

There is known a hard disc drive apparatus which is provided with a disc-shaped recording medium and is capable of storing a great deal of data on the disc-shaped recording medium.

This hard disc drive apparatus is mainly used as a mass data storage device for computer processing. The disc-shaped recording medium arranged in the hard disc drive apparatus is driven at a predetermined rotational speed irrespective of the transmission rate of data to be recorded thereon. The data is magnetically recorded on cylindrical tracks formed on the disc.

There has also been developed a technique to optically record data on a disc-shaped recording medium, for example, a so-called WORM (write once read many) disc or MO (magneto-optical) disc. The WORM disc is exposed to a laser beam, the light intensity of which is changed in response to data to be recorded thereon so that pits are formed on the WORM disc to thereby record the data thereon. Data is recorded on the MO disc by applying a magnetic field having a predetermined magnitude to a magnetic film formed on the disc and at the same time exposing the film to a laser beam, whose light intensity is changed in response to the data to be recorded, to thereby control the magnetization direction of the magnetic film with the result that the data is recorded magneto-optically on the MO disc.

In the case of the WORM disc, the data once recorded thereon can not be erased while the data recorded on the MO disc can be erased. It is therefore possible in the case of the MO disc to record data again in the data recording region on which once recorded data has been erased.

A disc drive apparatus provided with a disc-shaped recording medium on which data is optically recorded can also be used as a mass data storage device for computer processing. Accordingly, the disc-shaped recording medium, on which the data is optically recorded, is rotated at a predetermined constant speed irrespective of the transmission rate of the data to be supplied to and to be recorded to the disc drive apparatus.

There are a number of ways that time-sequential data can be generated and the transmission rate of such time-sequential data can differ from one source to another. Such time-sequential data can be, for example, an audio signal or video signal which is transmitted through a telephone line as digital data at a regulated standard transmission rate, e.g. as 1.536 Mbps in Japan and 2.048 Mbps in the European Community.

A compact disc (CD) player is an apparatus which reproduces an audio signal recorded on a compact disc as digital data. The so-called 8 mm video recorder (VTR) is an example of an apparatus which can transform an audio signal into a digital signal, record the transformed digital signal with a video signal on a 8 mm width magnetic tape, and reproduce the recorded signals therefrom. Further, there is a digital audio tape recorder using rotary heads (so-called R-DAT) which can record and reproduce an audio signal.

The sampling frequency of the audio signal for the CD player is regulated as 44.1 kHz, and the sampling frequency for reproducing the audio signal in the 8 mm VTR is about 31.5 kHz. In the case of the R-DAT, it is possible to select as an adequate sampling frequency from 32 kHz, 44.1 kHz, or 48 kHz and then an audio signal is reproduced. Furthermore, when an audio signal is sampled and then recorded, there is a variation in the quantitization number or sampled data length such as 8 bits, 12 bits, 16 bits, and so on, dependent on the respective apparatus. As a result, the transmission rate of the data to be reproduced by the respective apparatus differs from one apparatus to another.

It was for these reasons heretofore impossible to record digital data having different transmission rates on one disc.

OBJECTS AND SUMMARY OF THE INVENTION

Accordingly, it is an object of the present invention to provide a method and an apparatus for optically recording digital signals on a disc in which when time-sequential data such as an audio signal or video signal is to be optically recorded, the disc-shaped recording medium is rotated in response to the transmission rate of the data to thereby sequentially record the data in each sector formed on the recording medium.

According to a first aspect of the invention there is provided an apparatus for optically recording an input signal on a disc-shaped recording medium which is divided into a plurality of sectors and the input signal is sequentially recorded on each of the sectors, the apparatus being selectively supplied with a plurality of time-sequential data which respectively have a predetermined transmission rate, the apparatus comprising:

means for recognizing the transmission rate of the time-sequential data;

means for controlling the rotational speed of the disc-shaped recording medium in response to a signal outputted from the data transmission rate recognizing means;

means for generating an error correcting code for the time-sequential digital data to be recorded in each of the sectors so as to correct a possible error which may occur in the time-sequential digital data and for adding the error correcting code to the time-sequential digital data; and recording signal generating means for converting the time-sequential digital data added with the error correcting code into a signal adequate to be recorded in each sector of the disc-shaped recording medium, wherein a laser beam produced by the recording signal generating means is irradiated on the disc-shaped recording medium which is rotated in accordance with the data transmission rate of the time sequential digital data supplied to the apparatus to thereby record the time-sequential digital data on the disc-shaped recording medium.

According to a second aspect of the invention, there is provided a method of optically recording an input signal sequentially on each one of a plurality of sectors on a disc shaped recording medium, the input signal being in the form of a plurality of time-sequential data which have different predetermined transmission rates, the method comprising the steps of:

recognizing the transmission rate of the time-sequential data and generating a corresponding output signal;

controlling the rotational speed of the disc-shaped recording medium in response to the output signal from the data transmission rate recognizing step;

generating an error correcting code for the time-sequential digital data to be recorded in each of the sectors so as to correct possible errors which may occur in the time-sequential digital data;

adding the error correcting code to the time-sequential digital data;

converting the time-sequential digital data including the error correcting code into a signal for recording in each sector of the disc-shaped recording medium;

rotating the disc-shaped recording medium in accordance with the data transmission rate of the time-sequential digital data supplied to the apparatus; and irradiating a laser beam produced from the recording signal generating step on the disc-shaped medium to thereby record the time-sequential digital data on the disc-shaped recording medium.

The above and other objects, features and advantages of the present invention will be apparent from the following detailed description of the preferred embodiment taken in conjunction with the accompanying drawings, throughout which like reference numerals designate like elements and parts.

DESCRIPTION OF THE PREFERRED EMBODIMENT

Now, an embodiment of the present invention will hereinafter be described with reference to FIGS. 1-5, wherein a magneto-optical disc drive apparatus employs a magneto-optical disc as a recording medium.

Figure 2A:
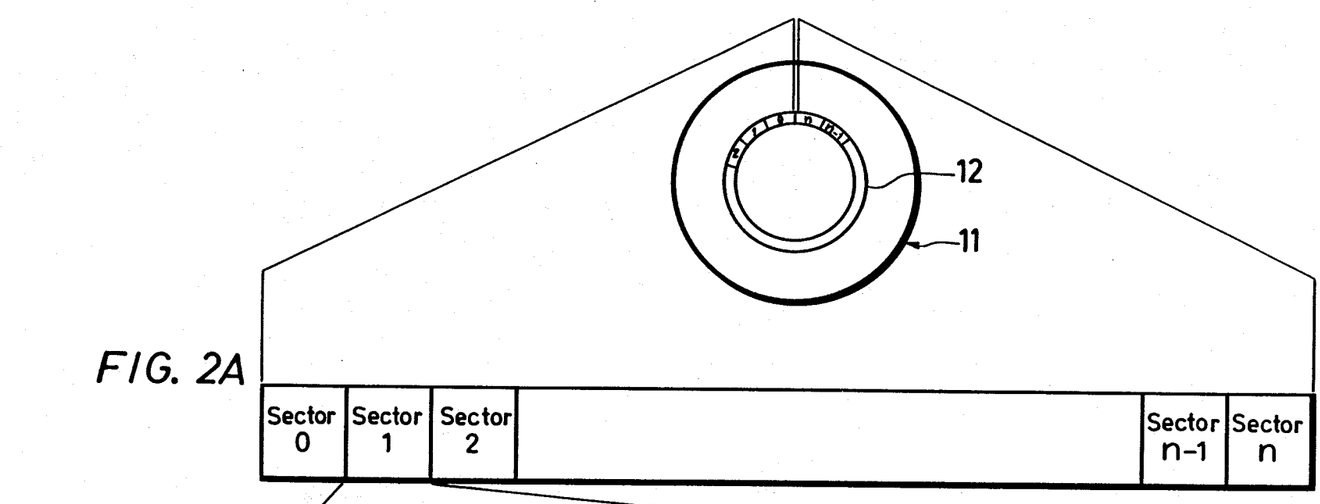
FIG. 2A, 2B is a diagram showing a sector format of a disc used in the disc drive apparatus shown in FIG. 1.
Figure 2B:
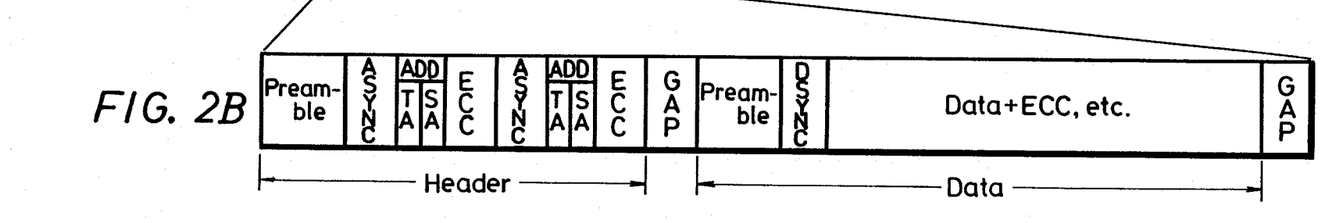

FIGS. 2A and 2B show a sector format of a magneto-optical disc used in this embodiment. A magneto-optical disc 11 has a track 12 cylindrically formed thereon. The track 12 is divided into a plurality of sectors. Data, including an error correcting code for correcting possible errors occurring in the data, and an error detecting code, are sequentially recorded in each sector on the magneto-optical disc 11. It can be seen from FIG. 2A that one track 12 is formed of (n+1) sectors, wherein n is, e.g. 31.

FIG. 2B shows a practical example of the format of each sector. Each sector comprises a header portion, a data portion, and gap portions GAP provided after each of the header and the data portions.

In the header portion, preamble data is recorded at the head and following thereto there is recorded an address signal ADD comprising a track address data TA and a sector address data SA with an error correction code (ECC) for correcting possible errors in the address signal and also with an address synchronizing signal ASYNC for synchronizing the address data. In this example, the address synchronizing signal ASYNC, the address signal ADD and the error correcting code ECC are formed twice in the header portion.

Further, in the data portion, there are recorded preamble data at the head and thereafter a data synchronizing signal DSYNC and the data to be recorded on the magneto-optical disc with an error correcting code (ECC) for correcting possible errors in the data.

Incidentally, FIG. 2A shows that the tracks are concentrically formed on the disc so that the disc can be used as a mass storage device for computer processing. However, it is preferable for the present invention that the tracks are spirally formed on the disc. Such a spiral track has a similar sector format to that discussed above for concentric tracks.

Figure 3:
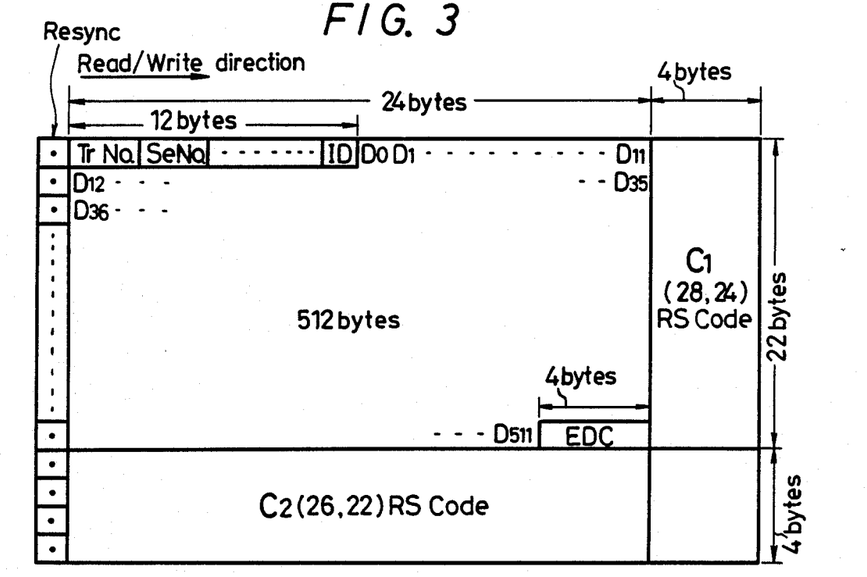
FIG. 3 is a diagram showing an arrangement of the data stored in a data area of one sector shown in FIG. 2.

The preamble signal, the address synchronizing signal ASYNC, the address signal ADD, and the error correcting code ECC recorded for the address signal ADD in the header portion, or the preamble signal and the data synchronizing signal DSYNC in the data portion can be previously recorded on the disc when the disc is manufactured, or simultaneously recorded with the data to be recorded on the data portion of the disc. The unit quantity of the data to be recorded in the data portion of each sector is, in general, determined as 512 bytes, considering that the disc is used as a storage medium for a computer. FIG. 3 shows the construction of the data portion for the above-mentioned case.

Referring to FIG. 3, the information data to be recorded in each sector is 512 bytes, i.e. $D_0$–$D_{511}$. Preceding the 512 bytes of data $D_0$ to $D_{511}$, there are additionally recorded 12-bytes of supplementary data comprising a track number TrNo, a sector number SeNo, and data identification information ID indicative of the classification of the data to be recorded in the sector. An error detecting code EDC, e.g. a 4-byte CRC (cyclic redundancy check code) is produced and added to the last portion of the 524-bytes of data described above. The 528-bytes of data comprising the 12-bytes of supplementary data, the 512-bytes of data and the 4-byte error detecting code EDC, is sequentially arranged from the first column, first row, along the row direction to thereby form a rectangular array formed as a matrix having 22 rows and 24 columns. Then, a first error correcting code $C_1$ having 4 bytes, e.g. a (28, 24) Reed-Solomon code, is produced and added to each 24-bytes of data arranged in the row direction of the rectangular array, and in the same manner, a second error correcting code $C_2$, e.g. a (26, 22) Reed-Solomon code, is produced and added to each column of data. Referring again to FIG. 3, at the head of each row of data there is recorded a synchronizing signal Re-SYNC, indicative of the head of each row, by which the data is sequentially recorded and read along the row direction.

Reference is next made to the function of the embodiment of the present invention which records data having a variety of transmission rates on and reproduces the same from a disc defined by the above-mentioned sector format.

Figure 1:
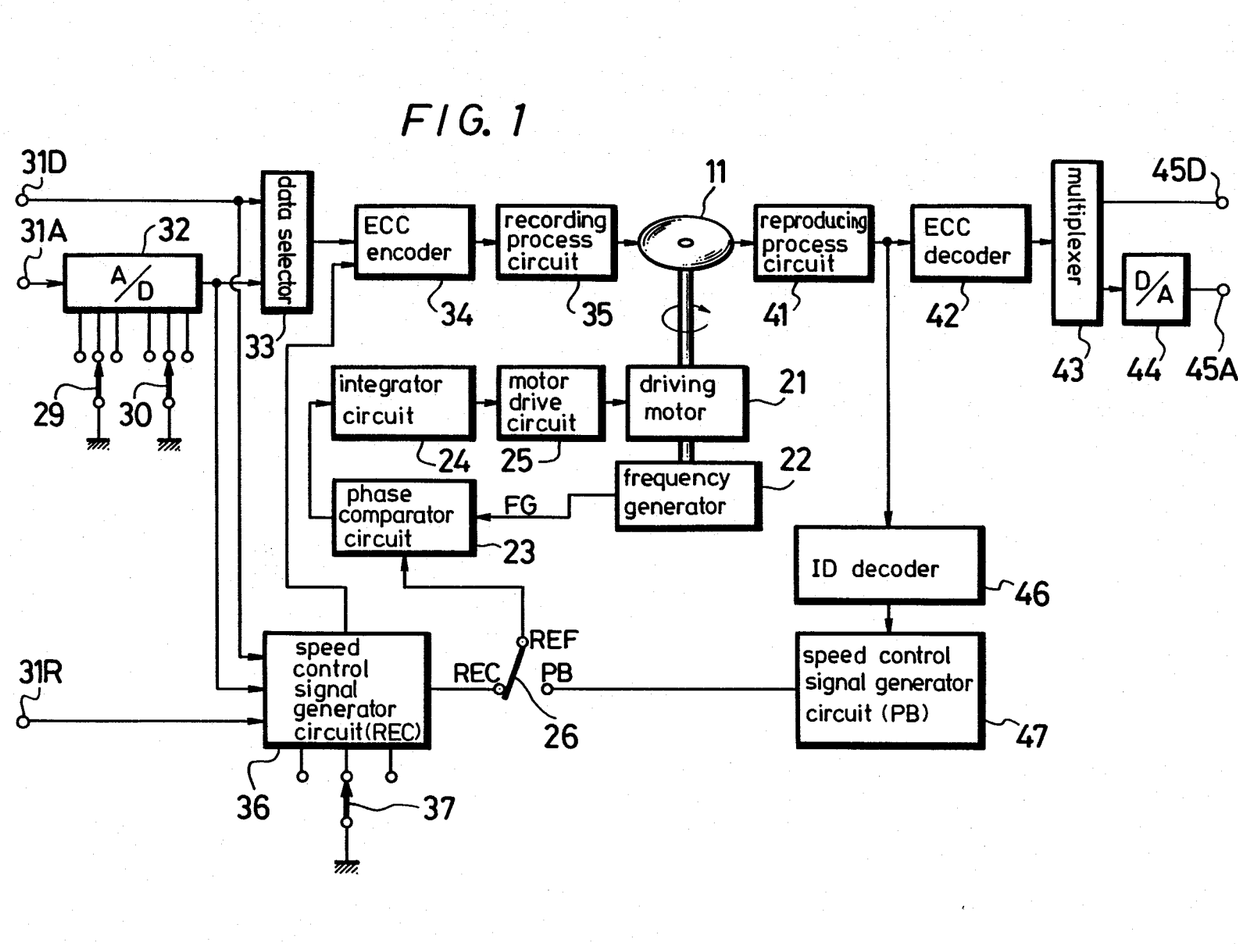
FIG. 1 is a block diagram showing an embodiment of a disc drive, apparatus according to the invention.

FIG. 1 is a block diagram showing a disc drive apparatus which is arranged for carrying out the recording and reproducing according to the present invention.

In FIG. 1, reference numeral 11 designates a magneto-optical disc on which the data recording is made as e.g. a spiral track. A conventional recording and reproducing head used in the apparatus, though not shown, is controlled in tracking such that on playback the head correctly scans the previously formed track.

Reference numeral 21 designates a disc driving motor by which the disc 11 is controlled so as to be rotated at a predetermined speed, i.e. at a constant angular velocity. To be more specific, the driving motor 21 is provided with a frequency generator 22 which generates a frequency signal FG proportional to the rotational speed of the driving motor 21. The frequency signal FG is supplied to a phase comparator circuit 23. The phase comparator circuit 23 is also supplied with a speed control signal REF.

Although this speed control signal REF is varied according to the transmission rate of the data to be recorded or reproduced, as will be later described in detail, it has a frequency corresponding to that of the output signal FG from the frequency generator 22 when the disc 11 is rotated at an intended rotational speed. The speed control signal REF may be substituted with a signal that has a frequency obtained by dividing the frequency of the signal FG. In that case, the output signal FG should also be frequency-divided by the same dividing ratio before being supplied to the comparator circuit 23.

An output signal from the phase comparator circuit 23, i.e. the comparison result, is integrated by an integrator circuit 24 to generate a speed error signal indicative of the difference between the speed reference signal and the actual rotational speed of the motor 21. Then, the speed error signal is fed back to the motor 21 through a motor drive circuit 25 so that the motor 21 rotates at a constant speed corresponding to the speed control signal REF.

Reference is now made to the recording system arranged in the apparatus according to the invention. In FIG. 1, reference numeral 31D designates an input terminal to which are inputted digital data such as data from a computer (not shown) as well as analog audio data which has been sampled at various predetermined sampling frequencies and supplied as time-sequential data. Each data is sampled as one word made of a predetermined number of bits. Therefore, inputted to the input terminal 31D is a plurality of digital data having various data transmission rates. The digital data inputted to the input terminal 31D is supplied to a data selector 33.

When time-sequential data is inputted to the digital data input terminal 31D, there can be a case where a signal indicative of the transmission rate thereof is transmitted therewith. In this case, the signal indicative of the transmission rate is supplied to an input terminal 31R.

Reference numeral 31A designates an input terminal to which is supplied an analog signal, e.g., an audio signal, video signal, and so on. The analog signal inputted to the input terminal 31A is supplied to an A/D converter 32 to be converted into a corresponding digital signal. The sampling frequency of the A/D converter 32 can be changed by a sampling frequency change-over switch 29 to various values, e.g. 32 kHz, 44.1 kHz, 48 kHz and so on, corresponding to the supplied signals. Further, a quantitization number change-over switch 30 is provided to select the length or bit number of one sample from various numbers of bits, e.g. 8 bits, 12 bits, 16 bits and so on. The digital signal from the A/D converter 32 is supplied to the data selector 33.

The data selector 33 selects, by manual operation or a control signal supplied thereto from an external circuit (not shown), one of the digital signals from the input terminal 31D or from the A/D converter 32. The digital signal selected by the selector 33 is then supplied to an ECC encoder 34 for producing an error correcting code which is added to the rectangular array, wherein data is formed in the manner described above into a block to be recorded in one sector, i.e. a block containing 512-bytes of data.

If the data supplied to the ECC encoder 34 is digital data having an 8-bit length per one word, the data can be divided into 512-byte blocks of data to be recorded in each sector. When one word length is not 8 bits, but e.g. 12 bits, 16 bits, and so on, in FIG. 3 one row cannot be formed of integer words, i.e. one word may extend over two rows, or two sectors, as the case may be. This inconvenience can be prevented by adequately changing the byte length or number in the row direction of the data matrix shown in FIG. 3. The data outputted from the ECC encoder 34, wherein the error correcting code is produced and added to the data, is supplied to a recording process circuit 35 to be adequately modulated, supplied to an optical pickup (not shown) in the form of a serial data, and then recorded on the magneto-optical disc 11.

At this time, the rotational speed of the disc 11 must be controlled so as to be synchronized with the transmission rate of the digital data to be recorded. This is done by changing a mode switch 26 over to a terminal REC side so that the signal generated from a speed control signal generator circuit 36 is supplied to the phase comparator circuit 23 as the speed control signal REF.

If the time-sequential data to be recorded from the input terminal 31D is a so-called self-clocking type digital data signal, the data from the input terminal 31D is supplied to the speed control signal generator circuit 36, wherein the clock signal of the data is extracted therefrom, the transmission rate thereof is detected on the basis of the clock signal, and a speed control signal corresponding to the transmission rate calculated is generated by and delivered from the circuit 36 to the phase comparator circuit 23.

If the time-sequential data supplied to the input terminal 31D is not of the so-called self-clocking type, but, instead, a signal indicative of the transmission rate of the data, e.g. a clock signal is sent separately from the data, the signal indicative of the transmission rate is supplied through the input terminal 31R to the speed control signal generator circuit 36 which generates a speed control signal corresponding to the transmission rate obtained from the signal indicative of the transmission rate.

If an analog signal is supplied to the input terminal 31A, a switch 37 is changed over according to the aforementioned sampling frequency and a bit number of one word length is selected, so that a speed control signal corresponding to the transmission rate is generated by the speed control signal generator circuit 36.

Let it be assumed that the time-sequential data inputted to the input terminal 31D is one whose transmission rate is previously known and which is not a self-clocking type signal, and that the signal indicative of the transmission rate is not transmitted. In such a case a speed control signal corresponding to the known transmission rate can be manually selected by the switch 37.

The motor 21 is driven in a manner that the phase (frequency) of the speed control signal REF corresponding to the transmission rate thus obtained and that of the frequency signal FG generated by the frequency generator 22 coincide with each other, and thereby the disc 11 is rotated at a rotational speed in correspondence with the transmission rate of the inputted data.

In this case, the signal corresponding to the transmission rate of the data from the signal generator circuit 36 is supplied to the ECC encoder 34 and the identification signal indicative of the transmission rate is recorded on the disc 11 as a portion of the data identification information ID in the supplementary data of the data structure shown in FIG. 3. Also recorded as a portion of the data identification information ID in the supplementary data are the sampling frequency and the bit number forming one word length of the data.

Incidentally, if the time-sequential data supplied to the input terminal 31D is encoded data to which is added a parity and other redundancy bits, the data is first decoded to be only inherent digital data.

The magneto-optical disc has a large capacity, so that the data may contain redundancy bits. In this case, however, the transmission rate may be varied a little. It is therefore required to change the rotational speed of the disc 11 in response to the variation in the transmission rate.

Further, the identification information ID indicative of the transmission rate of the data to be recorded in each sector may be recorded in a directory area which is allocated at a predetermined area provided, for example, in the most inner track or the most outer track of the disc.

Furthermore, the sampling frequency and word length of sampled data with which the analog/digital conversion is effected by the A/D converter 32 may also be recorded in this directory to be used when the data is reproduced.

Figure 5:
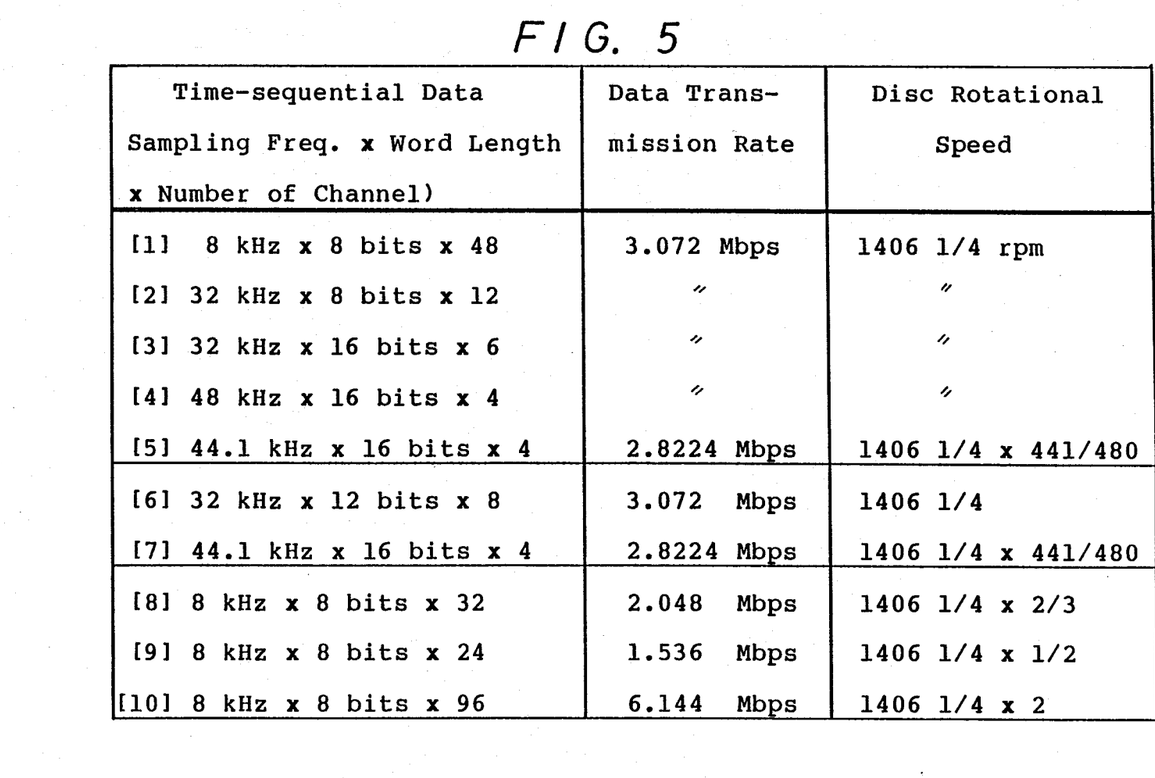
FIG. 5 is a table showing the relationship among time-sequential data to be recorded on a disc, the transmission rate thereof, and the rotational speed of the disc corresponding to the transmission rate.

FIG. 5 is a table showing the relationship among inputted data assumed to be used in actual practice, the transmission rate thereof and the rotational speed of the disc corresponding to the transmission rate. Examples [1]-[5] in the table are data for the case where an audio signal including a voice signal is to be recorded on the disc. Example [1] is data when a voice signal is recorded on the disc wherein the sampling frequency is determined as 8 kHz, the word length or quantization number of one sample as 8 bits, and the channel number for a signal to be recorded is 48 channels. In the same manner, examples [2]-[5] are data for audio signals such as music signals or the like. Particularly, example [4] is time-sequential data outputted from the aforementioned R-DAT, and example [5] is data outputted from a CD player. The transmission rate of the digital data in examples [1]-[4] is 3.072 Mbps, and that of the digital data in example [5] is 2.8224 Mbps. The driving motor is controlled so that the disc is rotated, e.g. at 1406¼ rpm (revolution per minute) or 1406¼×441/480 rpm, corresponding to the transmission rate. In this example, the quantity of the data to be recorded in one sector is determined as 512 bytes and the number of sectors per one rotation is 256.

Examples [6] and [7] show the case where a broadcast signal is received through a satellite in the form of digital data, wherein the transmission rates thereof are respectively determined as 3.072 Mbps and 2.8224 Mbps, and the disc is rotated at corresponding speeds.

Examples [8]-[10] show data for the case where a digital signal, in the form of a sound signal or the like, is transmitted through a telephone line. The transmission rate shown in example [8], that is, 2.048 Mpbs, is a standard transmission rate used in Europe (EC), and those shown in examples [9] and [10] are standard transmission rates used in Japan. The disc is rotated according to these transmission rates.

In each of these examples, the rotational speed of the disc 11 is varied as mentioned above, however, the total number of bits recorded on a disc is consistent. Namely, the recording time differs according to transmission rates.

As is clear from FIG. 5, the rotational speed of the disc can be changed from one value to another to accommodate the transmission rates of time-sequential data outputted from various audio apparatus or various standard transmission rates for digital data. Further, according thereto it is also possible to record the sound reproduced from a digital audio tape recorder on a disc without any modification.

Referring again to FIG. 1, the reproducing system according to the invention will now be described. The time-sequential data reproduced from the disc 11 by the optical pickup (not shown) is supplied to a reproducing process circuit 41 to be demodulated. The output signal from the reproducing process circuit 41 is then supplied to an ID decoder 46 for the identification information ID. Decoded therein is the ID signal indicative of the transmission rate and so on recorded in the supplementary data area of each sector of the disc.

A speed control signal generator circuit 47 is supplied with the decoded signal indicative of the transmission rate from the ID decoder 46. The circuit 47 generates a speed control signal in accordance with the decoded transmission rate. The speed control signal in turn is supplied to the phase comparator circuit 23 through a playback side terminal PB of the switch 26. Thus, the disc 11 is rotated at a rotational speed in correspondence with the transmission rate of the recorded data.

When the data indicative of the transmission rate and the like are recorded in the directory allocated in a predetermined area of the disc, the speed control signal for controlling the rotation of the disc upon playback can be generated by reading the data indicative of the transmission rate, prior to the data reproducing.

The data thus reproduced at a rotational speed in correspondence with the data transmission rate is supplied to an ECC decoder 42 through the reproducing process circuit 41, wherein error correction process and so on are carried out for the reproduced data at the unit of every sector. The error corrected reproduced data is then converted to only inherent data, i.e. with redundancy data removed. If the reproduced data thus processed is to be outputted in the form of digital data, the data is delivered to an output terminal 45D by a multiplexer 43. If the reproduced data is to be outputted in the form of an analog signal, the data is supplied to a D/A converter 44 to be converted into an analog signal before being delivered to an output terminal 45A.

The data required to effect D/A conversion, e.g. the sampling frequency and the bit number of one word of data in the D/A converter 44 can be determined by decoding the data identification information ID stored in the sector of the disc or reading the data recorded in the directory allocated in a predetermined area of the disc, and the D/A conversion in response to the data known can thereafter be carried out.

The data indicative of the transmission rate, the sampling frequency, the word length of one sample and so on may be recorded in a part of the header portion which is positioned ahead of the data portion in each sector.

In the above case, the driving motor 21, i.e. the rotation of the disc 11, is controlled at a constant angular velocity. However, the above described invention can be applied to the case where the driving motor 21 is controlled to rotate the disc 11 at a constant linear velocity which is changed in accordance with the transmission rate of the time-sequential data to be supplied.

Further, in the embodiment shown in FIG. 1, the identification information ID is derived from the output of the reproducing process circuit 41. However, when the identification information ID is written in the supplementary data area of the data arrangement constructed as shown in FIG. 3, the information ID can also be error-corrected by the use of the error correcting codes $C_1$ and $C_2$. Therefore, the system may be constructed such that the information ID is derived from the output of the ECC decoder 42. It is the same when the information ID is written in the header portion of the sector. In other words, since it is known where the identification information ID is written on the disc, the information ID can be read out before the error correcting process as well as after the same.

Now, reference is made to how time sequential data having different transmission rates can be recorded and reproduced without changing the rotational speed of the disc. It is not necessary to use the whole data area of one sector, i.e. all 512 bytes. By allocating the data number in accordance with the sampling frequency and the word length of the data to be recorded to each sector, data having different transmission rates can be recorded on a disc without changing the rotational speed of the disc.

Figure 4:
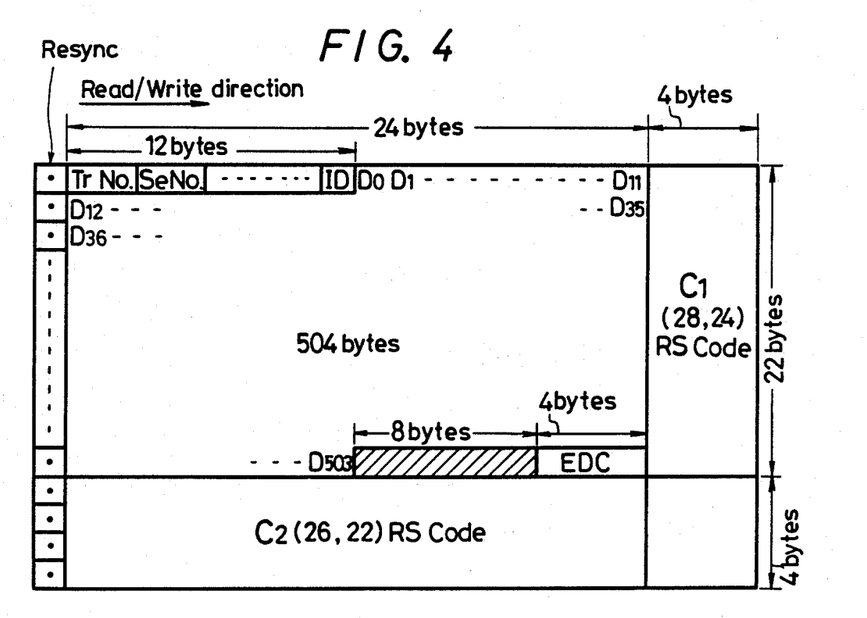
FIG. 4 is a diagram showing a modification of the data arrangement shown in FIG. 3.

To specifically explain this method, assume that the rotational speed of the disc is $1406\frac{1}{4}$ rpm, and the data transmission rate 3.072 Mbps. The PCM audio signal of the 8 mm VTR is specified, e.g. as follows: the sampling frequency thereof is 31.5 kHz, the word length per one sample 8 bits, and the number of transmission channels 12. Then, the transmission rate is determined as 3.024 Mbps, so that the PCM audio signal can not be recorded and reproduced with a good matching state at the rotational speed of $1406\frac{1}{4}$ rpm. Therefore, to overcome this problem, the last 8 bytes in the usable 512 bytes of data in one sector, as indicated with hatching in FIG. 4, is left unused, that is, the usable data area is made as 504 bytes. The data area of the last 8 bytes all may be filled with "0" or "1" or used as an area for writing parameters or the like. Since the 512-bytes of data comprises 4096 bits and 4096 is not a multiple of 12, the 12-bytes of audio data can not be allocated with good matching. However, as mentioned above, if the capacity of the data area is changed from 512 bytes to 504 bytes, it comprises 4032 bits. Since 4032 is a multiple of 12, 12-bit data can be recorded and reproduced with good matching from each sector without a word (one sample) of data extending over two sectors.

The following advantage is effected by changing the byte number recordable in the data area of one sector from 512 bytes to 504 bytes. That is, two signals whose transmission rate is a bit different from each other corresponding to the sampling frequency thereof, e.g. a satellite broadcast signal whose sampling frequency is 32 kHz and the PCM audio signal for 8 mm VTR whose sampling frequency is 31.5 kHz, can be recorded on the same disc without changing its rotational speed. The reason for this is that when the time-sequential data having a sampling frequency of 32 kHz is recorded in one sector whose capacity is 512 bytes and the time-sequential data having a sampling frequency of 31.5 kHz is recorded in one sector whose capacity is 504 bytes, the corresponding relationship $504/512 = 31.5/32$ is established between the sector capacity ratio and the sampling frequency ratio.

Even though the capacity of a sector is changed from 512 bytes to 504 bytes, the CRC codes as the error detecting code (EDC) and the parities $C_1$, $C_2$ are produced for the whole data of 512 bytes including the unused last 8 bytes. To be specific, the 4-byte CRC code is produced for 524 bytes of data which includes 512-bytes of data and 12-bytes of supplementary data and for the data of 528 bytes thus constructed the parities $C_1$, $C_2$ are produced. It is therefore possible to substantially record and reproduce data having different transmission rates although the transmission rate of the data to be recorded on the disc is not changed, i.e. always 3.072 Mbps. When the sampling frequency is changed from 32 kHz to 31.5 kHz or vice versa, it is necessary to correct the difference in the transmission rate, which is effected by e.g. a RAM provided in the ECC encoder and the ECC decoder.

Further, the information indicative of the quantity or byte number of the data recorded in one sector, e.g. the identification signal indicative of 512 bytes or 504 bytes, is recorded in the header portion or the supplementary data area in each sector as the identification signal ID. The same signal can also be recorded on a directory provided in a predetermined area of the most inner or the most outer track of the disc.

In the reproducing procedure, when, by previously detecting the signal indicative of the quantity or data byte number of recorded data from the data in each sector or the directory, the reproduced digital signal is obtained from the ECC decoder 42, only the byte number of the data recorded in one sector is read from the RAM, whereby the time-sequential data at the original transmission rate can be obtained.

Having thus described a preferred embodiment of the invention wherein a magneto-optical disc is used as the recording medium, it is clear that the present invention is not limited thereto.

As described above, according to the present invention, by recording a great deal of time-sequential digital data on a recordable magneto-optical disc, recording over a long time period and without signal deterioration becomes possible. Further, the rotational speed of the optical disc is controlled in response to the transmission rate of the time-sequential data, so that time-sequential data having different transmission rates can be recorded on the same magneto-optical disc in real time. Also, since the rotational speed of the disc is increased as the transmission rate of the time-sequential digital data becomes higher, an error correcting code is produced and added to the time-sequential digital data recorded in each sector so as to prevent possible errors from occurring in data due to the fact that the amount of light of the laser beam is decreased in inverse proportion to the increase in the rotational speed of the disc.

The above description is given of a single preferred embodiment of the invention but it will be apparent that many modifications and variations could be effected by one skilled in the art without departing from the spirit or scope of the novel concepts of the invention so that the scope of the invention should be determined by the appended claims only.

We claim as our invention:

1. Apparatus for optically recording an input signal on one or more sectors of a disc-shaped recording medium having a plurality of sectors, the apparatus being selectively supplied with time sequential data having a plurality of predetermined transmission rates, the apparatus comprising:

data transmission rate recognizing means for extracting clock information included in said time-sequential digital data, recognizing the data transmission rate on the basis of the extracted clock information and outputting a corresponding signal;

rotational speed control means for controlling the rotational speed of said disc-shaped recording medium in response to said signal outputted from said data transmission rate recognizing means;

means for generating an error correcting code for said time-sequential digital data to be recorded in said sectors so as to correct a possible error which may occur in said time-sequential digital data and for adding said error correcting code to said time-sequential digital data; and recording signal generating means for converting said time-sequential digital data to which is added said error correcting code into a signal for recording in one or more sectors of said disc-shaped recording medium, said recording signal generating means including electromagnetic energy beam generating means for irradiating a beam of electromagnetic energy on said disc-shaped recording medium which is rotated by said rotational speed control means in accordance with the data transmission rate of the time sequential digital data supplied to said apparatus to thereby record said time-sequential digital data on said disc-shaped recording medium.

2. Apparatus for optically recording an input signal on the sectors of a disc-shaped recording medium, the apparatus being selectively supplied with time-sequential data having a plurality of predetermined transmission rates, the apparatus comprising analog/digital converting means for converting time-sequential analog signals supplied to said apparatus into time-sequential digital data;

data transmission rate recognizing means for extracting clock information included in said time-sequential digital data, recognizing the data transmission rate on the basis of the extracted clock information and outputting a corresponding signal;

rotational speed control means for controlling the rotational speed of said disc-shaped recording medium in response to said signal outputted from said data transmission rate recognizing means;

means for generating an error correcting code for said time-sequential digital data to be recorded so as to correct a possible error which may occur in said time-sequential digital data and for adding said error correcting code to said time sequential digital data; and recording signal generating means for converting said time-sequential digital data added to said error correcting code into a signal for recording in one or more sectors of said disc-shaped recording medium, said recording signal generating means including means for irradiating a beam of electromagnetic radiation onto said disc-shaped recording medium which is rotated by said rotational speed control means in accordance with the data transmission rate of the time sequential digital data supplied to said apparatus to thereby record said time-sequential digital data on said disc-shaped recording medium.

3. Apparatus according to claim 2 further comprising switching means for changing the sampling frequency or the word length of one sample in said analog/digital converting means.

4. Apparatus according to claim 2 further comprising switching means for changing the sampling frequency of one sample in said analog/digital converting means.

5. Apparatus according to claim 2 further comprising switching means for changing the word length of one sample in said analog/digital converting means.

6. Apparatus according to claim 2, further comprising means for receiving time-sequential digital data and further comprising data selecting means for selecting as the time-sequential digital data to be error corrected and recorded either said received time-sequential digital data or said time-sequential digital data as converted from said time-sequential analog data by said analog/digital converting means.

7. Apparatus according to claim 6, further comprising means for recognizing each transmission rate of said received time-sequential data and outputting a corresponding signal to the rotational speed control means.

8. Apparatus according to claims 1 or 2, wherein said rotational speed control means drives said recording medium at a constant angular velocity which is determined on the basis of the signal outputted from said means for recognizing the transmission rate.

9. Apparatus according to claims 1 or 2, wherein said rotational speed control means drives said recording medium at a constant linear velocity which is determined on the basis of the signal outputted from said means for recognizing the transmission rate.

10. Apparatus according to claims 1 or 2, wherein said disc-shaped recording medium is a magneto-optical disc on which said time-sequential digital data is magneto-optically recorded by the use of a laser beam.

11. Apparatus according to claims 1 or 2, wherein said disc-shaped recording medium is one on which said time-sequential digital data is recorded as pits by a laser beam.

12. Apparatus according to claim 2, wherein the transmission rate recognizing means extracts the clock information included in said time-sequential digital data on the basis of the sampling frequency and the word length of one sample with which said time-sequential analog signal is converted into time sequential digital data by aid analog/digital converting means.

13. Apparatus for optically recording an input signal on the sectors of a disc-shaped recording medium, the apparatus being selectively supplied with time-sequential data having a plurality of predetermined transmission rates, the apparatus comprising:

analog/digital converting means for converting time-sequential analog signals supplied to said apparatus into time-sequential digital data;

means for recognizing the transmission rate of said time-sequential digital data on the basis of the sampling frequency and the word length of one sample with which said time-sequential analog signal is converted into time-sequential digital data by said analog/digital converting means and for outputting a corresponding output signal;

rotational speed control means for controlling, the rotational speed of said disc-shaped recording medium in response to said signal outputted from said data transmission rate recognizing means, and further wherein the rotational speed control means rotates the disc-shaped recording medium at a constant speed during the recording of time-sequential digital data having different data transmission rates and further includes means for changing the number of bytes of data of the signal to be recorded in each sector of the recording medium as a function of the sampling and the word length to be recorded in each sector;

means for generating an error correcting code for said time-sequential digital data to be recorded so as to correct a possible error which may occur in said time-sequential digital data and for adding said error correcting code to said time-sequential digital data; and recording signal generating means for converting said time-sequential digital data added to said error correcting code into a signal for recording in one or more sectors of said disc-shaped recording medium, said recording signal generating means including means for irradiating a beam of electromagnetic radiation onto said disc-shaped recording medium which is rotated by said rotational speed control means in accordance with the data transmission rate of the time-sequential digital data supplied to said apparatus to thereby record said time-sequential digital data on said disc-shaped recording medium.

14. A method for recording an input signal on a disc-shaped recording medium having a plurality of sectors comprising the steps of:

supplying time-sequential data at one of a plurality of predetermined transmission rates;

generating an error correcting code for said time-sequential digital data for correcting a possible error which may occur in said time-sequential digital data;

adding said error correcting code to said time-sequential digital data;

converting said time-sequential digital data including said error correcting code into a signal for recording in one or more sectors of said disc-shaped recording medium;

extracting clock information included in said time-sequential digital data, recognizing the data transmission rate on the basis of the extracted clock information and rotating said disc-shaped recording medium in accordance therewith; and recording said recording signal in one or more sectors of said disc-shaped recording medium.

15. A method for recording an input signal on the sectors of a disc-shaped recording medium having a plurality of sectors comprising the steps of:

receiving and converting time-sequential analog signals supplied to said apparatus into time-sequential digital data;

generating an error correcting code of said time-sequential digital data for correcting a possible error which may occur in said time-sequential digital data;

adding said error correcting code to said time-sequential digital data;

converting said time-sequential digital data including said error correcting code into a signal for recording in one or more sectors of said disc-shaped recording medium;

extracting clock information included in said time-sequential digital data and recognizing the data transmission rate on the basis of the extracted clock information, rotating said disc-shaped recording medium in accordance with the recognized transmission rate of the said time sequential digital data; and recording said recording signal in one or more sectors of said disc-shaped recording medium.

16. A method as recited in claims 14 or 15 wherein the recording step comprises irradiating a laser beam, whose intensity is modulated with the recording signal, on said disc-shaped medium to thereby record said time-sequential digital data on said disc-shaped recording medium.

17. A method according to claim 15 wherein the step of extracting the clock information included in said time-sequential digital data includes the step of deriving the clock information from the sampling frequency and the word length of one sample with which said time-sequential analog data is converted into digital data upon said analog/digital converting step.

18. Apparatus for optically recording an input signal on one or more sectors of a disc-shaped recording medium having a plurality of sectors, the apparatus being selectively supplied with time-sequential data having a plurality of predetermined transmission rates, the apparatus comprising:

means for recognizing each transmission rate of said time-sequential data and outputting a corresponding signal;

rotational speed control means for controlling the rotational speed of said disc-shaped recording medium in response to said signal outputted from said data transmission rate recognizing means;

means for generating an error correcting code for said time-sequential digital data to be recorded in said sectors so as to correct a possible error which may occur in said time-sequential digital data and for adding said error correcting code to said time-sequential digital data; and recording signal generating means for converting said time-sequential digital data to which is added said error correcting code into a signal for recording in one or more sectors of said disc-shaped recording medium, said recording coding signal generating means including electromagnetic energy beam generating means for irradiating a beam of electromagnetic energy on said disc-shaped recording medium which is rotated by said rotational speed control means in accordance with the data transmission rate of the time sequential digital data supplied to said apparatus to thereby record said time-sequential digital data on said disc-shaped recording medium and further wherein the recording signal generating means further includes means for recording on the recording medium, at a predetermined area, a signal corresponding to the data transmission rate output signal from the means for recognizing the transmission rate of the time-sequential data.

19. A method for recording an input signal on the sectors of a disc-shaped recording medium having a plurality of sectors comprising the steps of:

receiving and converting time-sequential analog signals supplied to said apparatus into time-sequential digital data;

recognizing the transmission rate of said time-sequential digital data on the basis of the sampling frequency and the word length of one sample with which said time-sequential analog data is converted into digital data upon said analog/digital converting step;

generating an error correcting code for said time-sequential digital data for correcting a possible error which may occur in said time-sequential digital data;

adding said error correcting code to said time-sequential digital data;

converting said time-sequential digital data including said error correcting code into a signal for recording in one or more sectors of said disc-shaped recording medium;

recognizing the transmission rate of said supplied time-sequential data and rotating said disc-shaped recording medium in accordance therewith; and recording said recording signal in one or more sectors of said disc-shaped recording medium and recording on the recording medium, at a predetermined area, a signal corresponding to the data transmission rate.

20. Apparatus for optically recording an input signal on the sectors of a disc-shaped recording medium, the apparatus being selectively supplied with time-sequential data having a plurality of predetermined transmission rates, the apparatus comprising:

analog/digital converting means for converting time-sequential analog signals supplied to said apparatus into time-sequential digital data;

means for recognizing the transmission rate of said time-sequential digital data on the basis of the sampling frequency and the word length of one sample with which said time-sequential analog signal is converted into time-sequential digital data by said analog/digital converting means and for outputting a corresponding output signal;

rotational speed control means for controlling, the rotational speed of said disc-shaped recording medium in response to said signal outputted from said data transmission rate recognizing means;

means for generating an error correcting code for said time-sequential digital data to be recorded so as to correct a possible error which may occur in said time-sequential digital data and for adding said error correcting code to said time-sequential digital data; and recording signal generating means for converting said time-sequential digital data added to said error correcting code into a signal for recording in one or more sectors of said disc-shaped recording medium, said recording signal generating means including means for irradiating a beam of electromagnetic radiation onto said disc-shaped recording medium which is rotated by said rotational speed control means in accordance with the data transmission rate of the time sequential digital data supplied to said apparatus to thereby record said time-sequential digital data on said disc-shaped recording medium, wherein the recording signal generating means further includes means for recording on the recording medium, at a predetermined area, a signal corresponding to the data transmission rate output signal from the means for recognizing the transmission rate of the time-sequential data.

* * * * *